No. 681,481. Patented Aug. 27, 1901.
T. C. JOHNSON.
AUTOMATIC FIREARM.
(Application filed Apr. 26, 1901.)
(No Model.) 6 Sheets—Sheet 2.

No. 681,481. Patented Aug. 27, 1901.
T. C. JOHNSON.
AUTOMATIC FIREARM.
(Application filed Apr. 26, 1901.)

(No Model.) 6 Sheets—Sheet 4.

No. 681,481. Patented Aug. 27, 1901.
T. C. JOHNSON.
AUTOMATIC FIREARM.
(Application filed Apr. 26, 1901.)
(No Model.) 6 Sheets—Sheet 6.

UNITED STATES PATENT OFFICE.

THOMAS C. JOHNSON, OF NEW HAVEN, CONNECTICUT, ASSIGNOR TO WINCHESTER REPEATING ARMS CO., OF SAME PLACE.

AUTOMATIC FIREARM.

SPECIFICATION forming part of Letters Patent No. 681,481, dated August 27, 1901.

Application filed April 26, 1901. Serial No. 57,563. (No model.)

*To all whom it may concern:*

Be it known that I, THOMAS C. JOHNSON, of New Haven, in the county of New Haven and State of Connecticut, have invented a new Improvement in Automatic Firearms; and I do hereby declare the following, when taken in connection with the accompanying drawings, and the numerals of reference marked thereon, to be a full, clear, and exact description of the same, and which said drawings constitute part of this specification, and represent, in—

Fig. 24$^a$, a detached view, in inside elevation, of the ejector-block; Fig. 24$^b$, a corresponding plan view thereof.

My invention relates to an improvement in that class of firearms in which the breech mechanism is automatically operated for reloading and recocking the arm by the firing of the same, the object being to produce a simple, compact, durable, reliable, and convenient arm constructed with particular reference to safety and reliability of operation and to reducing the number and increasing the strength of the parts.

With these ends in view my invention consists in an automatic firearm having certain details of construction and combinations of parts, as will be hereinafter described, and pointed out in the claims.

Although the features of my present invention may be embodied in firearms differing in size and in the character of the ammunition employed, I have chosen to represent my present invention in connection with a rifle designed to employ rim-fire cartridges. I do not, however, limit myself to using my invention in such a firearm.

For convenience of explanation I propose to describe the several parts of my improved firearm in substantially the order in which the arm is manipulated in being charged with cartridges, loaded, and fired.

Figures 13, 14, 15, 16, 17, 18, 19:
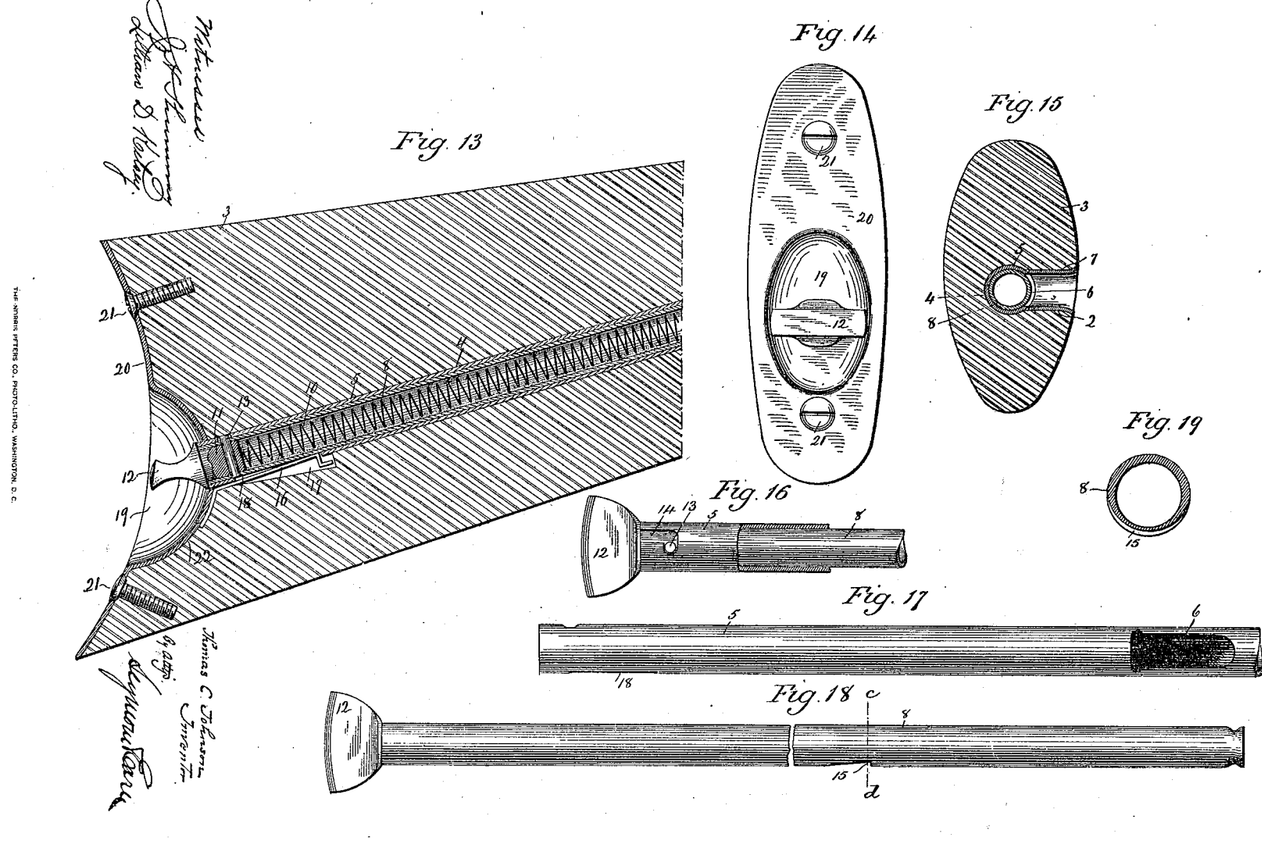
Fig. 13 a view in vertical longitudinal section of the rear end of the butt-stock and may be read in conjunction with Fig. 4 of the drawings, of which it virtually constitutes a rear extension.
Fig. 14, an end view of the butt-stock, showing the cup-like depression in the butt-plate.
Fig. 15, a view of the butt-stock in transverse vertical section on the line $a\,b$ of Fig. 1.
Fig. 16, a detached broken view, partly in elevation and partly in section, of the rear ends of the outer and the inner magazine-tubes, showing them locked together.
Fig. 17, a detached broken view of the outer magazine-tube, showing its cartridge-receiving opening.
Fig. 18, a detached broken view of the inner magazine-tube, showing its stop-shoulder.
Fig. 19, a view of the inner magazine-tube in transverse section on the line $c\,d$ of Fig. 18, also showing the said stop-shoulder.
Figure 20:
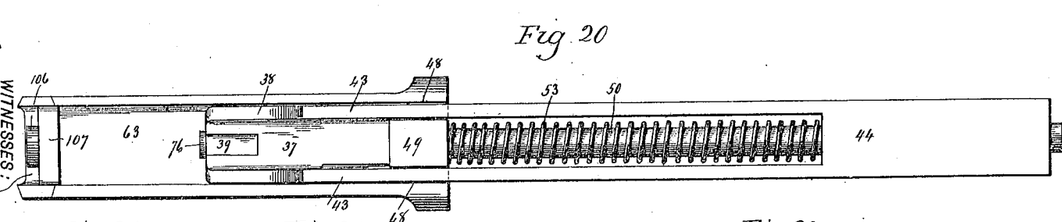
Fig. 20, a detached reverse plan view of the receiver and the breech-block of the arm.
Figure 21:
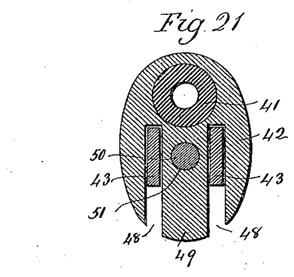
Fig. 21, a view in vertical transverse section on the line $e\,f$ of Fig. 1, showing the receiver, the arms of the balancing extension of the breech-block, and the guide-rod coacting with the said extension.
Figure 22:
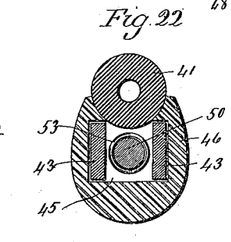
Fig. 22, a corresponding view on the line $g\,h$ of Fig. 1, showing the gun-barrel, the fore-stock, and the said arms and rod.

In carrying out my invention as herein shown I form a lateral cartridge-feeding opening 2 in the right-hand side of the butt-stock 3 about midway the length thereof. This opening is arranged parallel with the lower edge of the butt-stock and approximately corresponds in shape to the longitudinal profile of the cartridges which it is designed to use in the gun, the forward end of the opening being rounded to correspond to the bullet ends of the cartridges and the rear end of the opening being laterally enlarged to correspond to the flanged heads of the cartridges. In short, the shape of the opening is such that cartridges cannot be introduced into it except in right endwise presentation— that is to say, with their bullet ends forward. At its inner end the said opening 2 intersects a long circular bore or passage 4, extending throughout the length of the butt-stock and located just below the center thereof. The said passage 4 receives an outer magazine-tube 5, which is formed with a cartridge-receiving opening 6, extending parallel with the length of the tube, substantially corresponding to the longitudinal profile of the cartridges and arranged to register with the inner end of the cartridge-feeding opening 2, already described. As shown, the said cartridge-feeding opening 2 is lined by a flattened tube-like escutcheon 7, having its outer end slightly flared and corresponding in section to the longitudinal profile of a cartridge. It is not imperative that this escutcheon should be used, although desirable. The cartridges are fed one by one through the escutcheon 7, from the inner end of which they pass through the cartridge-receiving opening 6 into the outer magazine-tube 5. The gun meanwhile is held so that the action of gravity will cause the cartridges to slide forward in the outer magazine-tube 5 and form a column therein. When the required number of cartridges have been introduced into the butt-stock in the manner described, they are confined in place by the forward movement over them of a longitudinally-movable inner magazine-tube 8, substantially corresponding in length to the outer magazine-tube 5 and introduced thereinto through the rear end thereof and rearwardly movable therein to a sufficient extent to permit its forward or inner end to be drawn to a point in rear of the cartridge-feeding opening 2 in the butt-stock and the cartridge-receiving opening 6 in the outer magazine-tube. The said inner magazine-tube contains a follower 9, the rear end of which is made hollow for the reception of the forward end of the cartridge-feeding spring 10, the rear end of which impinges against the inner end of the stem 11 of a flattened operating-button 12, which is secured to the said inner tube by means of a pin 13, one end of which projects for coaction with an L-shaped locking-slot 14, formed in the extreme rear end of the outer magazine-tube 5, as shown in Fig. 16. In order to prevent the inner magazine-tube from being retracted or drawn outward more than is necessary to clear its forward end from the rear ends of the openings 2 and 6, it is formed with a transversely-arranged stop-shoulder 15, Figs. 18 and 19, coacting with a stop-spring 16, located in a small chamber 17, formed to receive it within the rear end of the butt-stock and acting upon the said shoulder through a clearance-slot 18, formed in the rear end of the outer magazine-tube. For the retraction of the inner magazine-tube the button 12 is grasped by the fingers and the tube turned from right to left to clear the projecting end of the pin 13 from the short end or leg of the L-shaped locking-slot 14, formed in the outer magazine-tube. The said inner magazine-tube being now unlocked is pulled rearwardly without obstruction until its forward end has been brought to a point in rear of the rear ends of the openings 2 and 6, immediately after which the stop-spring 16 will engage with the stop-shoulder 15 and prevent the further retraction of the tube. When the said inner tube is moved forward over a column of cartridges previously introduced into the outer tube, the said column may be said to enter it rear end foremost with the cartridges "head first;" but it is more accurate to say that the inner tube is shoved forward over the column of cartridges, which it prevents from escaping through the openings 6 and 2 and in which the cartridges are placed under the tension of the cartridge-feeding spring 10. Just before the inner tube reaches its fully forward or closed position the projecting end of its pin 13 enters the long end or leg of the locking-slot 14 in the outer tube, in which slot the pin moves forward until the inner tube is brought to a stop, after which the said inner tube is slightly rotated from left to right, whereby the said pin is caused to enter the transversely-arranged short end or leg of the said slot, thus locking the inner magazine-tube to the outer magazine-tube. If it is desired to entirely remove the inner magazine-tube from the butt-stock, it is turned from right to left and drawn slightly rearward, so as to unlock it from the outer magazine-tube, and then rotated sufficiently to clear its stop-shoulder 15 from the stop-spring 16, after which the tube may be pulled entirely away from the butt-stock.

To provide a housing, as it were, for the button 12, I form an oval cup-like depression 19 in the butt-plate 20, which is secured to the butt-stock by screws 21 21, the said depression 19 being entered into a recess 22, of corresponding shape, formed for the purpose in the end of the butt-stock. The depression 19 on account of its shape and size permits the button 12 to be readily grasped and turned by the fingers, and at the same time so houses the said button that it is quite out of the way.

Figures 4, 5:
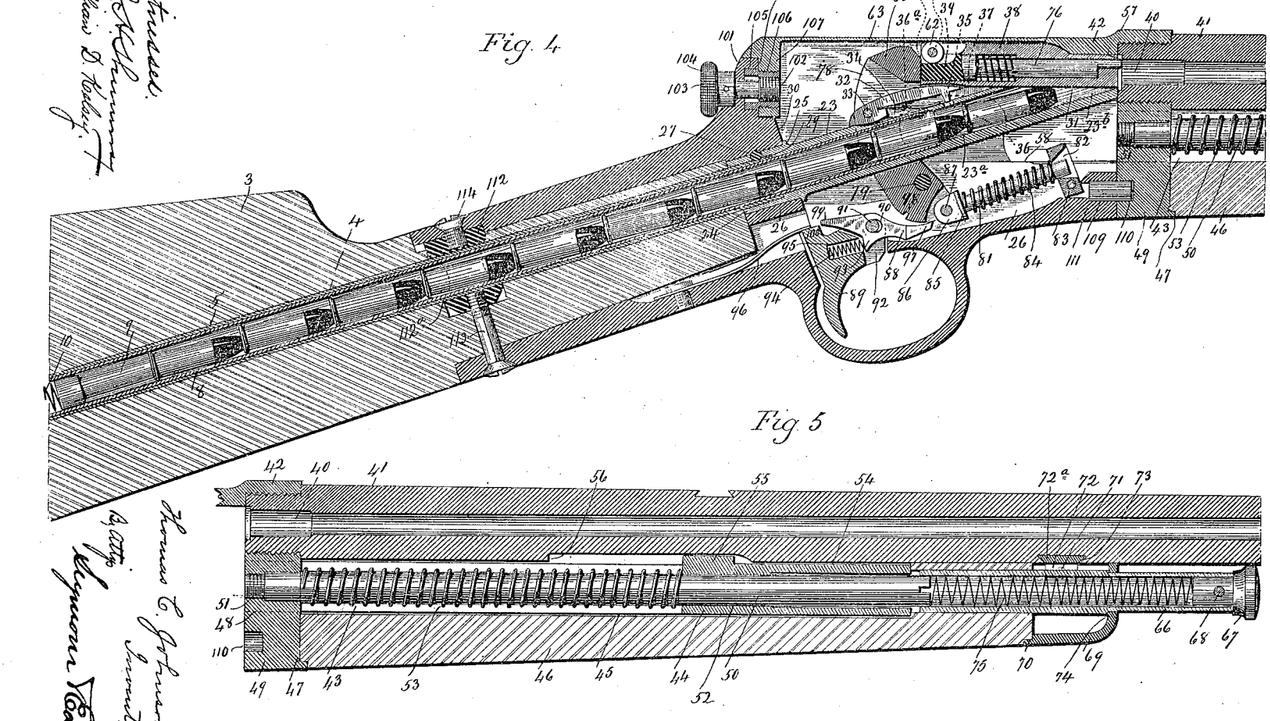
Fig. 4, a broken view of the arm in vertical longitudinal central section, showing the parts of the breech mechanism in their closed relations.
Fig. 5, a corresponding but less comprehensive view designed to show the balancing extension of the breech-block, the chambering of the fore-stock for the reception of the said extension, and the plunger for manually opening the breech-block.

A cartridge-feeding chute 23, traversed by a longitudinal cartridge-passage 23$^a$, receives the cartridges from the cartridge-receiving butt-stock and feeds them forward in the arm. As herein shown, this chute is formed at its rear end with a sleeve 24 and with an annular flange 25, located at the forward end thereof, the said sleeve receiving the forward end of the outer magazine-tube 5, of which the said chute virtually constitutes a continuation. The said chute is mounted in the tang 26 of the arm and secured thereto by a pin 27, passing through a transverse groove 28 in the sleeve 24 and also taking into a corresponding but shallower transverse groove 29, formed in the forward end of the outer magazine-tube. The said pin 27 therefore performs the twofold function of securing the chute 23 to the tang 26 and of securing the outer magazine-tube 5 to the chute, the flange 25 of which bears directly upon the forward face 30 of the tang, as shown in Fig. 4. The upper portion of the forward end of the chute is formed with a long beveled face 31, giving a pointed effect to the said end of the chute, the lower edge of which, however, is straight. The said cartridge-passage 23$^a$ intersects at its forward end the said beveled face 31 and forms the discharge-opening 23$^b$ of the chute.

A longitudinally-arranged cartridge cut-off 32, designed to coact with the heads rather than with the bodies of the cartridges, is pivotally mounted on a pin 33, passing through its rear end and also through the rear ends of two parallel flanges 34, formed upon the rear end of the upper face of the chute and having the said cut-off located between them. At its forward end the said cut-off is formed with a depending cut-off tooth 35, which passes downward through an opening 36, formed in the chute, located between the forward ends of the flanges 34, and enters the cartridge-passage 23$^a$ of the chute. When the forward end of the cut-off is depressed, the said cut-off tooth 35 enters the said passage 23$^a$ through the opening 36 and coacts with the heads of the cartridges, the escape of which through the discharge-opening 23$^b$ of the chute it controls. As shown, the rear edge of the tooth 35 is beveled to facilitate the action of the heads of the cartridges in lifting the forward end of the cut-off into its retired or inoperative position. The cartridges are assisted in this function by a leaf-spring 36$^a$, mounted in the cut-off and engaging with the chute at a point between the two flanges 34. This spring exerts a constant effort to lift the forward end of the cut-off, which it may be relied upon to do without any assistance from the cartridges acting on the beveled rear edge of the tooth 35, or the beveled rear edge of the tooth 35 may be relied upon alone to effect the lifting of the cut-off through the cartridges. The cut-off does not act on the foremost or terminal cartridge of the column, but on the cartridge immediately behind the same, as will appear later on. The said cut-off 32 is operated in controlling the escape of the cartridges from the chute by the engagement with its curved upper edge of the forward portion of the lower face 37 of the breech-block 38, the extreme rear end of the said face being formed with a recess 39, which permits the cut-off to rise sufficiently to clear its cut-off tooth 35 from the path of the cartridges through the chute. Of course some other form of breech-closure than the breech-block 38 herein shown would coact with the cut-off in controlling the operation of the same.

When the gun is closed, as shown in Fig. 4, the forward end of the cut-off 32 is lifted into the recess 39 in the breech-block 38 and the foremost cartridge is pushed forward by the cartridge-feeding spring 10 past the cut-off tooth 35 of the cut-off until it is stopped by the engagement of its forward end with the lower face 37 of the breech-block. Now when the breech-block begins its rearward or opening movement it "rides," so to speak, over the cut-off and forces the forward end downward, whereby the cut-off tooth 35 takes a position to be engaged in due course by the rim of the second cartridge to the rear. As the breech-block moves rearward it liberates the foremost or terminal cartridge, which is shot forward out of the chute 23 by the action of the cartridge-feeding spring 10; but only the foremost cartridge is liberated, because the tooth 35 of the cut-off 32 is now in position to be engaged by the rim of the said second cartridge, which will not be liberated until the breech-block is again moved into its closed position, so as to permit the cut-off 32 to rise again into its retired or inactive position. Now when the breech-block begins its forward or closing movement it picks up the liberated cartridge and pushes the same into the cartridge-chamber 40 of the gun-barrel 41, which is screwed into the forward end of the frame or receiver 42. I may add that it will often happen, and perhaps always happens, that the liberated cartridge will be shot forward into the chamber 40 by the force of the cartridge-feeding spring 10; but in case it is not sent home thereby it will be forced home by the forward or closing movement of the breech-block. The said breech-block 38 belongs to that class of breech-blocks which are not positively locked for the purpose of taking the shock of recoil, but which are made to contain a quantity of metal proportioned to the weight of the bullet and its velocity, so that the shock of recoil will be absorbed by the aggregate mass of the breech-block, which, in a sense, therefore, balances the recoil. For that reason I shall speak of the breech-block as a "balanced" breech-block to distinguish it from positively-locked breech-blocks. The balancing portion of my improved breech-block consists, as shown, in a long forward balancing extension located in a plane below the breech-block proper, from which it is separated by a jog or shoulder comprising two corresponding parallel arms 43, located in vertical planes and merging at their forward ends into a chambered body 44, the said forward extension being square or substantially square in any transverse section of it and being proportioned in weight to the weight and velocity of the ammunition to be used in the gun, as before explained. The said balancing extension of the breech-block projects forward, as shown, under the gun-barrel 41 and plays back and forth in a chamber 45, formed for its reception in a fore-stock 46, the rear end of which is set into a shallow recess 47, formed in the forward end of the receiver 42, as shown in Fig. 5. The said arms 43 of the breech-block extension pass through vertical slots 48, formed in the forward end of the receiver and separated by a heavy post 49, forming a part thereof. The said extension is guided in moving back and forth by means of a heavy guide-rod 50, the rear end of which is threaded and entered into a suitably-threaded opening 51, formed for its reception in the post 49. The rear portion of the said rod lies between the said arms 43, while its forward portion passes through a longitudinally-arranged hole 52, formed for its reception in the body 44 of the extension.

Figure 24:
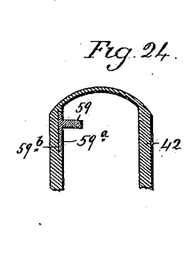
Fig. 24, a detached broken view, in vertical transverse section, of the receiver, with particular reference to showing how the ejector-plate is mounted in the receiver.
Figures 24A, 24B:
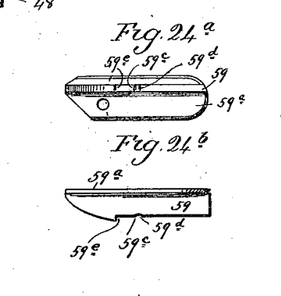
Figure 25:
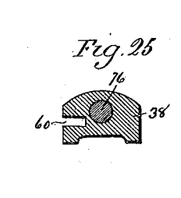
Fig. 25, a detached view, in vertical transverse section, of the breech-block on the line $i\,j$ of Fig. 7 to show the groove formed in it for the reception of the ejector.
Figures 26, 27, 28, 29, 30, 31, 32, 33, 34, 35, 36:
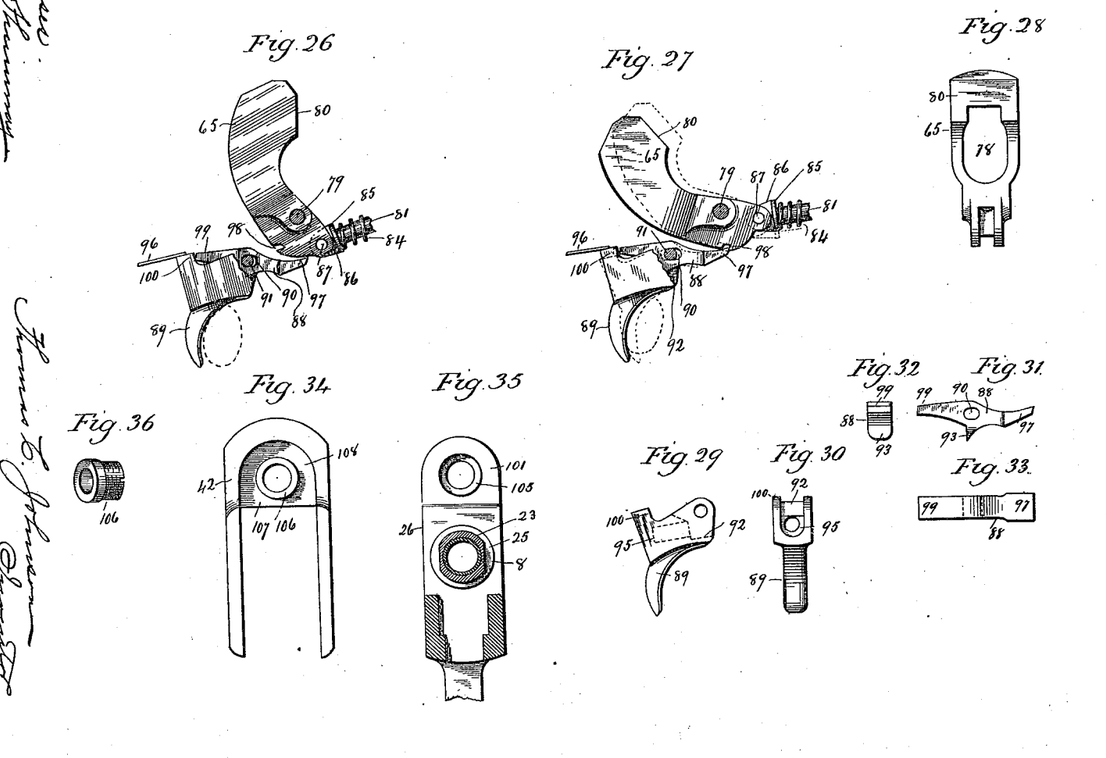
Fig. 26, a detail view showing the hammer, the trigger, and the longitudinally-movable sear, the trigger being represented in its retracted or "pulled" position and the sear in its forward position, in which the trigger does not coact with it for releasing the hammer and into which it is moved by its sear-spring.
Fig. 27, a corresponding view showing the hammer cocked and the sear in its inoperative position with respect to the trigger, the broken lines in this figure representing the same relation of the parts as are represented by full lines in Fig. 6.
Fig. 28, a detached view, in front elevation, of the hammer.
Fig. 29, a detached view, in side elevation, of the trigger.
Fig. 30, a detached view of the trigger in front elevation.
Fig. 31, a detached view, in side elevation, of the sear.
Fig. 32, a view thereof in rear elevation.
Fig. 33, a plan view thereof.
Fig. 34, a detached view of the receiver in rear elevation, showing features of the "take-down" provision of the gun.
Fig. 35, a view of the tang of the gun, partially in front elevation and partially in section, on the irregular line *k l* of Fig. 2.
Fig. 36, a detached perspective view of the combined guide and take-down bushing.
Figure 37:
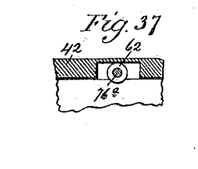
Fig. 37, a broken view, in vertical section, of a modified form of frame or receiver to show the location therein of an antifriction-roller for coaction with the breech-block to reduce the friction of the operation thereof.

For the purpose of automatically returning the breech-block to its normal or closed position I employ a spiral spring 53, encircling the rear portion of the guide-rod 50 and interposed between the forward face of the said post 49 and the rear end of the body 44 of the balancing extension. When the gun is fired and the breech-block is forced rearward by the recoil, the said spring 53 will be compressed and will almost immediately act to move the breech-block forward into its closed position, in which it exerts a constant forward thrust upon the cartridge in the gun-barrel, whereby the recoil-face 57 of the block is always engaged with the head of the cartridge. To clear the said gun-barrel 41, the upper face of the said body 44 is formed with a concavity 54, while to positively limit the rearward movement of the breech-block the said body is formed upon its upper face with a stop-shoulder 55, which engages at the limit of the rearward movement of the breech-block with a shoulder 56, formed upon the under face of the gun-barrel. The forward movement of the breech-block is stopped, of course, by the engagement of its recoil-face 57 with the extreme rear end of the barrel 41 and the adjacent portions of the frame or receiver 42. The lower edges of the said arms 43 of the balancing extension of the breech-block ride back and forth upon the edges 58, Figs. 2 and 4, of the upper face of the tang 26. When the gun is taken down, however, the breech-block is held up in its place within the receiver by means of the ejector 59, which enters a slot 60, formed to receive it in the left-hand wall of the breech-block 38, as shown in Fig. 25. The said ejector 59 is formed integral with and at a right angle to a plate 59$^a$, having beveled edges and entering a dovetail groove 59$^b$, formed in the inner face of the left-hand wall of the receiver, as shown in Fig. 24.

Figure 23:
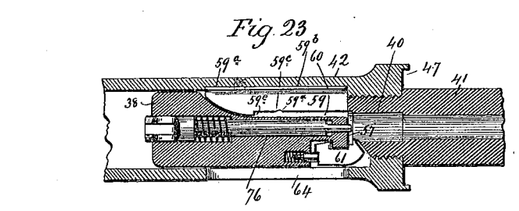
Fig. 23, a broken view of the arm in horizontal section with particular reference to showing the ejector located in the forward end of the receiver.

In order to prevent the spent shells from being ejected with too much violence during the automatic operation of the gun, I provide the ejector 59 with a spent-shell-ejecting shoulder 59$^c$, which is produced by forming a shallow vertical groove 59$^d$ in the edge of the ejector, as clearly shown in Fig. 23, at a distance from the rear end of the barrel 41 a little more than equal to the length of a spent shell. The ejector 59 is formed to the rear of the groove 59$^d$ with a loaded-cartridge-ejecting shoulder 59$^e$, which is brought into play when the gun is manually opened. An extractor-hook 61, of any suitable construction, is located in the right-hand wall of the breech-block and exerts a constant effort to push the spent shells of the cartridges laterally inward toward the said ejector 59. Now when the spent shells are being extracted by the hook 61 and pushed laterally inward toward the ejector their flanged heads will be forced into the groove 59$^d$ thereof, and so engaged with the ejecting-shoulder 49$^c$ of said groove, whereby as the rearward movement of the breech-block is continued the spent shells will be caused to be ejected through the ejection-opening 64. Under this construction and because of the slight and non-aggressive character of the shoulder 59$^c$ the spent shells are not ejected violently, as they would be if their heads were squarely impinged against the more aggressive square shoulder 59$^e$, which comes into play only when loaded cartridges are manually ejected, at which time the rearward movement of the breech-block is very much slower and less powerful, for the reason that the power of the hand is much inferior to the force of recoil. Furthermore, under this construction the spent shells are ejected just as soon as their front ends are cleared from the barrel, which is a very important time factor when the arm is being automatically operated by recoil, when it is necessary that the spent shells shall be speedily got out of the way, so as to allow loaded cartridges to take their place. The construction of the ejector may be varied, but however made its provision for ejecting spent shells when automatically operated will be less aggressive than its provision for ejecting loaded cartridges when manually operated. If the ejecting means take the form of shoulders, that for the ejection of spent shells in the automatic action of the arm will be differentiated from the shoulder for the ejection of loaded cartridges in the manual operation of the arm, so as to be less aggressive than the same in its action.

Figure 1:
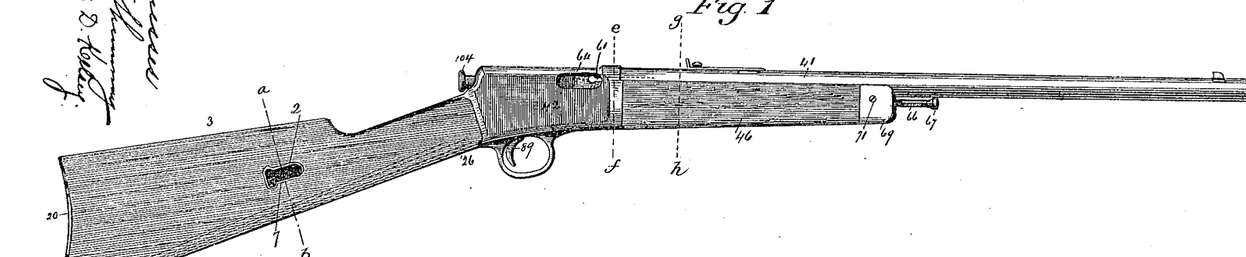
Figure 1, a view in side elevation of one form which an automatic firearm constructed in accordance with my invention may assume.
Figures 2, 3:
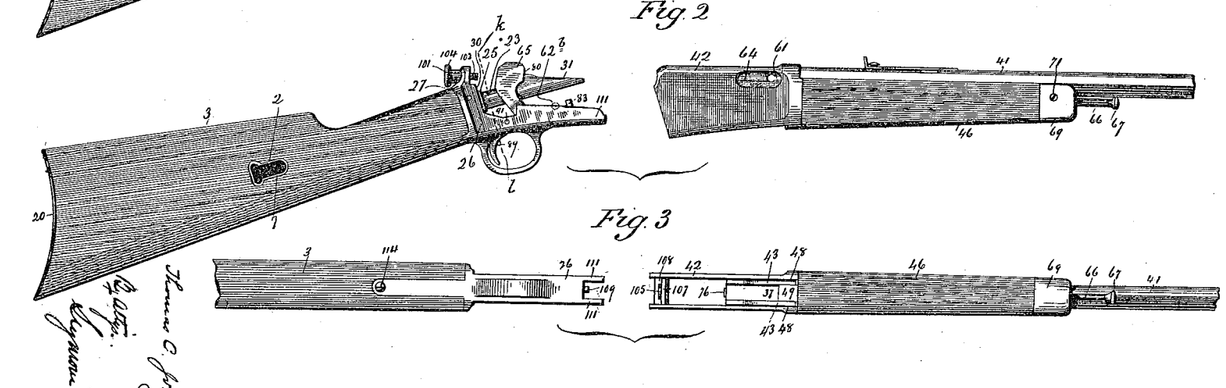
Fig. 2, a similar view of the arm "taken down" preparatory to packing for transportation.
Fig. 3, a reverse plan view of the arm taken down with the rear end of the butt-stock broken away.
Figures 7, 11:
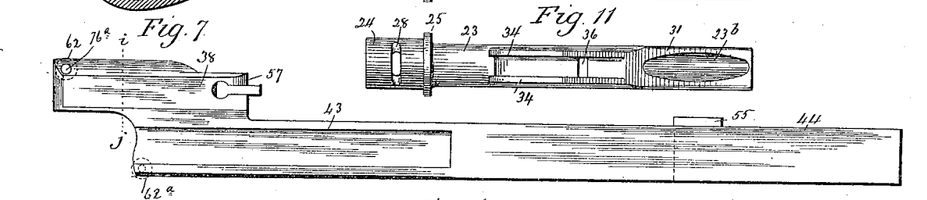
Fig. 7, a detached view of the breech-block in right-hand side elevation.
Fig. 11, a corresponding plan view of the cartridge-feeding chute.
Figure 8:
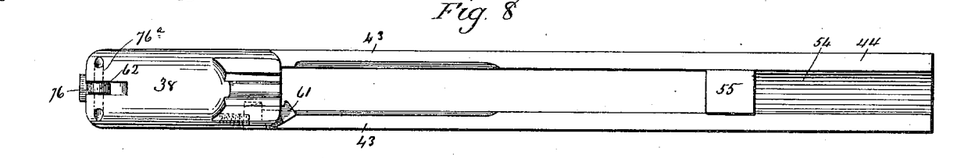
Fig. 8, a plan view thereof.
Figure 9:
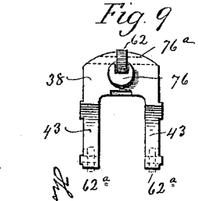
Fig. 9, a rear view thereof.

To reduce the friction of the movement of the breech-block back and forth, I prefer to employ one or more antifriction-rollers mounted in it, or in some part of the arm, or in both. As herein shown, the rear upper corner of the breech-block is provided with an antifriction-roller 62, which rides back and forth upon the inner face 63 of the top of the frame or receiver 42. This antifriction-roller performs a very important function in preventing the binding of the breech-block against the receiver under the upward-swerving thrust imparted to the rear end of the block in cocking the hammer 65. Furthermore, by employing this antifriction-roller I reduce the friction of operation so much that I am enabled to increase the weight of the breech-block, whereby I not only secure a better absorption of the recoil, but also reduce the amount of gas that escapes rearward after the explosion of a cartridge. In other words, I am enabled by the use of the antifriction-roller to replace friction by weight. I desire to particularly point out in this connection that the receiver has no cut or opening in its top exposing the breech mechanism and endangering the fingers of the user of the gun, which has no exposed movable parts. As shown in Figs. 7 and 9, the breech-block is also provided with antifriction-rollers 62$^a$, located at the extreme rear ends of the arms 43 of its balancing extension and designed to ride upon the upper edges of the forwardly-projecting portion of the tang 26 of the arm. In Fig. 2 the said portion of the tang is itself provided with an antifriction-roller 62$^b$ for coaction with the breech-block. Antifriction-rollers for reducing the friction of the operation of the breech-block might also be arranged and located in other ways; but those shown will make the idea clear.

For manually opening the arm, which is necessary for the introduction of the first cartridge into the gun-barrel, I employ a plunger 66, provided at its forward end with a button 67, secured in place by a pin 68 and mounted in the forward end of a heavy cap or tip 69, the rear end of which is provided with a rabbet 70 for the reception of the shouldered forward end of the fore-stock 46. The tip 69 is secured in place by means of a pair of screws 71, entering the opposite ends of a small block 72, formed with a dovetail rib 72$^a$, entering a corresponding undercut groove 73 in the lower face of the gun-barrel. The said plunger 66 is formed with a shoulder 74, which engages with the inner face of the forward end of the tip and limits its forward movement and is made tubular for the reception of a spiral spring 75, the rear end of which impinges against the forward end of the guide-rod 50, before described, and which exerts a constant effort to push the plunger forward. The plunger is adapted in length so that its rear end will normally clear and by the action of the said spring be held clear of the forward end of the body 44 of the breech-block extension, as clearly shown in Fig. 5, so that the swift reciprocating movement of the breech-block will not jar or disturb the plunger, which is not moved during the automatic operation of the arm. When, however, the plunger is operated, it slides over the forward end of the guide-rod, which acts as a guide for it, as well as for the extension of the breech-block. To start the operation of the arm, one cartridge is loaded into the barrel by manually pushing the said plunger 66 rearward until its button 67 strikes the forward face of the tip 69, whereby the breech-block is opened sufficiently to allow the foremost cartridge of the column to be shot out of the chute 23 into the barrel or into position to be forced thereinto by the breech-block and whereby also the hammer 65 is cocked in case it has fallen. After one cartridge has been introduced into the barrel the action of the arm becomes automatic, and the plunger is not thereafter used unless for manually extracting the loaded cartridges from the barrel.

The firing-pin 76, of usual construction, is located in the breech-block, its rearward movement being limited by the pin 76$^a$, on which the antifriction-roller 62 turns.

The hammer 65 of my improved arm is formed with a large central opening 78, which permits the cartridge-feeding chute to pass through it and which permits it to swing back and forth over the said chute, the said hammer being mounted on a pivot 79 at a point below the chute. The striking-face 80 of the hammer extends above the chute and is engaged by the lower rear corner of the breech-block during the rearward or opening movement thereof, whereby the hammer is cocked. The forwardly-extending lower end of the hammer is pivotally connected with a rod 81, the forward end of which passes through a flaring opening 82, formed in a guide-block 83, pivoted by its lower end to the forward end of the tang 26. A hammer-spring 84, encircling the rod 81, is interposed between the said guide-block 83 and the flange 85 of a head 86, located at the rear end of the rod 81 and connected with the hammer by a pin 87, which takes the sole thrust of the rod, there being a slight clearance between the hammer and the rear face of the flange 85.

In order that the entire charge of cartridges at any one time in the arm may not be automatically fired in rapid succession, rather than strictly at the will of the user of the arm, I construct the hammer 65, the sear 88, and the trigger 89 so that the trigger must be consciously released after the firing of each shot. That result I accomplish, as I particularly wish to emphasize, without the employment of additional parts. The essential feature of the improvement now under consideration is the longitudinal movement of the sear 88, which is provided for, as shown, by elongating the pivot-hole 90 thereof to receive its pivot-pin 91, upon which the trigger 89 also swings and which is itself mounted in the tang 26 of the arm. The sear fits within a recess 92, formed in the upper edge of the trigger, and is provided with a depending lug 93, impinged against by the forward end of a sear-spring 94, located in a socket 95, formed in the trigger, which is itself engaged by a leaf-like trigger-spring 96, extending rearwardly and secured to the inner face of the lower portion of the said tang. Of course the sear and trigger springs may be differently constructed and arranged. The sear-spring 94 will, however, in any construction or arrangement of it be weaker than the hammer-spring 84, the necessity for which will appear later on. The forward end of the sear is shaped to form a cocking-nose 97, adapted to enter a cocking-notch 98, formed in the heel of the hammer 65, which is not formed with any half-cocking notch. The rear end of the sear is shaped to form a combined stop and operating finger 99 for coaction with a combined stop and operating lug 100, formed at the rear upper corner of the trigger.

Figures 6, 10, 12:
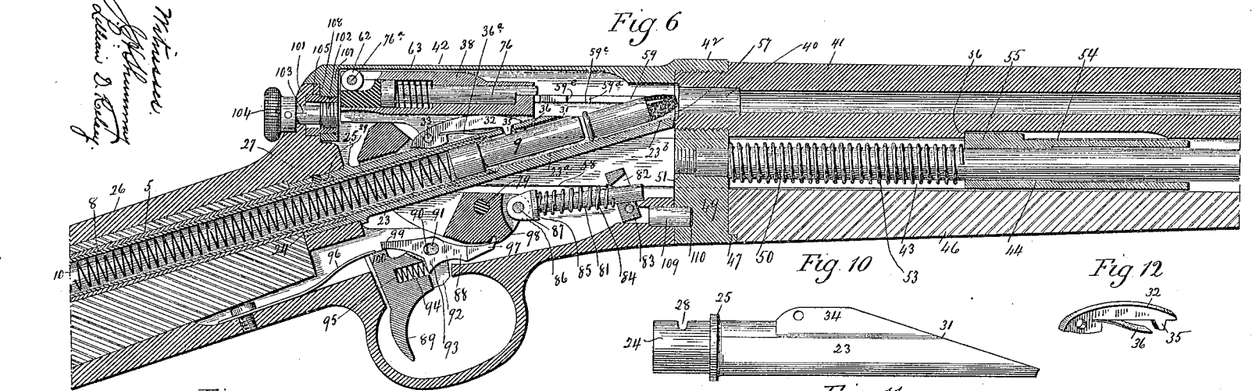
Fig. 6, a broken view of the gun in vertical longitudinal central section, showing the parts of the breech mechanism in their open relations.
Fig. 10, a detached view, in side elevation, of the cartridge-feeding chute.
Fig. 12, a detached perspective view of the cartridge cut-off.

When the parts are constructed as above described, the sear will be moved bodily forward longitudinally by its sear-spring 94 the instant after the pulling of the trigger 89 has withdrawn the cocking-nose 97 of the sear from the cocking-notch 98 of the hammer. This forward movement of the sear carries its combined stop and operating finger 99 forward beyond the operative range of the combined stop and operating lug 100 of the trigger. Now as the action of the gun in reloading and recocking is automatic the pulling of the trigger is almost instantly followed by the recocking of the hammer, which is effected by the entrance of the cocking-nose 97 of the sear into the cocking-notch 98 of the hammer under the action of the sear-spring 94, which exerts a constant effort to lift the forward end of the sear as well as to shove the sear bodily forward. If the rearward draft upon the trigger is not removed by the relaxation of the finger which pulled it, the sear will be moved bodily rearward by the hammer-spring 84 acting through the forward wall of the cocking-notch 98 and the forward edge of the cocking-nose 97 of the sear and overcoming the tension of the sear-spring 94, as aforesaid, which is weaker than the hammer-spring 84. In this way the sear will be moved rearward until its combined stop and operating finger 99 is abutted against the forward edge of the combined stop and operating lug 100 of the trigger. During the rearward movement of the sear, as described, the hammer will swing forward slightly; but that is immaterial. The arm cannot be fired with the parts in the positions just above described, inasmuch as the trigger is not in operative relation with the sear. To bring the parts into operative relations, rearward draft upon the trigger must be removed, so as to permit the trigger-spring 96 to act and swing the trigger downward, so as to move its combined stop and operating lug 100 below the combined stop and operating finger 99 of the sear, which will then be moved bodily rearward under the influence of the hammer-spring 84 into the position in which it is shown in Fig. 6. As the sear moves bodily rearward the hammer will swing forward again through a short arc; but this is not material. The arm may now be fired by pulling upon the trigger, the combined stop and operating lug 100 of which is now in position to operate upon and lift the finger 99 of the sear, whereby the cocking-nose 97 of the same may be withdrawn from the cocking-notch 98 of the hammer, so as to let the same fall. It will thus be seen that without the addition of any parts I am enabled to effectually prevent more than one cartridge being fired at a time in an arm automatically reloaded and recocked by recoil.

The take-down feature of my improved arm consists in forming the tang 26 with a heavy rounded upwardly-extending take-down lug 101, which is located at the forward end of its upper prong. In this lug I mount a take-down screw 102, having a stem 103 of smaller diameter and pinned to a knurled operating-button 104, which projects rearward beyond the rear face of the said lug 101. The stem 103 is made long enough to permit the screw 102 and button 104 to move back and forth. The inner face of the lug 101 is formed with a circular recess 105 for the reception of the rear end of a take-down bushing 106, mounted in a transversely-arranged bridge or web 107, formed integral with and located at the rear end of the frame or receiver 42 of the arm, this bushing being internally threaded for the reception of the take-down screw 102, as well as externally threaded for being secured in place in the bridge 107, in which, however, it may be secured by a pin or in any other way. The rear end of the bushing 106 is located within a recess 108, entering the extreme rear end of the frame or receiver 42 and adapted in size and contour to receive the lug 101, to which it conforms, so as to secure a close fit. The extreme forward end of the tang is provided with a dowel-pin 109, which enters a dowel-hole 110, entering the rear face of the lower end of the post 49, whereby the forward end of the tang is coupled with the frame or receiver 42. To put the arm together after it has been taken down, the two main parts of it are brought together, so that the said dowel-pin 109 of the tang is entered into the dowel-hole 110 in the receiver. At the same time the bushing 106 of the receiver enters the recess 105 in the inner face of the coupling-lug 101, which at the same time enters the recess 108 in the receiver. After the parts have been brought into their home positions the screw 102 is turned into the bushing 106 by the button 104, whereby the two parts of the arm are firmly bound together. To take down the gun, it is only necessary to turn the button 104 until the screw 102 has been disengaged from the bushing 105, after which the two main parts of the arm may be readily drawn away from each other.

When the arm is assembled, the two parallel forward projections or fingers 111 of the tang fill the corresponding openings on the opposite sides of the post 49 of the receiver, the lower edge of which is necessarily made open to permit my peculiar breech-block to be introduced into it from its lower edge rather than from its rear end, which is impossible on account of the presence there of the bridge 107.

In order to secure the butt-stock 3 between the upper and lower rear prongs of the tang 26, I employ, as herein shown, a coupling-head 112, having an opening 112ª for the passage through it of the outer magazine-tube 5 and formed with threaded openings for the reception of the screw 113, which passes upward through the lower rear prong of the tang, and for the reception of the screw 114, which passes downward through the upper rear prong of the tang.

It is apparent that the several features of my improvement are not necessarily embodied in the same arm and also that they may undergo considerable changes in form and arrangement in adapting them to arms differing in size and in the character of ammunition employed from the arm herein shown and described. I would therefore have it understood that I do not limit my invention to the precise construction herein shown, but hold myself at liberty to make such changes as fairly fall within the spirit and scope of my invention.

Having fully described my invention, what I claim as new, and desire to secure by Letters Patent, is—

1. In a firearm, the combination with a butt-stock having a lateral cartridge-feeding opening, of an outer cartridge-tube located within the said stock and having lateral communication with the said cartridge-feeding opening, and an inner magazine-tube longitudinally movable in the said outer magazine-tube into the outer end of which it is entered, the said inner magazine-tube being made to be grasped by its rear end and drawn rearward until its open forward end stands to the rear of the said cartridge-feeding opening whereby the cartridges may be fed through the said opening into the outer magazine-tube and the inner tube then shoved forward.

2. In a firearm, the combination with a butt-stock having a lateral cartridge-feeding opening, of a metal escutcheon introduced into said opening and shaped to conform to the longitudinal profile of a cartridge, whereby the right presentation of cartridges fed through it into the butt-stock is secured, of an outer magazine-tube located within the said stock and having lateral communication with the inner end of the said escutcheon, and an inner magazine-tube entered into the rear end of the said outer magazine-tube and made to be grasped by its outer end and drawn rearward so that its forward end will stand at a point in rear of the said cartridge-feeding opening whereby cartridges may be fed into the outer magazine-tube and the said inner magazine-tube then shoved forward over the cartridges.

3. In a firearm, the combination with a butt-stock, of a butt-plate applied thereto and formed with a cup-like depression which is received by the stock, of a magazine-tube longitudinally movable within the stock and provided at its outer end with a finger-piece or thumb-button which enters the said depression in the butt-plate when the said tube is in its home position.

4. In a firearm, the combination with a butt-stock having a lateral cartridge-feeding opening, of a butt-plate applied thereto and formed with a cup-like depression, of a fixed outer magazine-tube located within the said butt-stock and having lateral communication with the said feeding-opening, and an inner magazine-tube entered into the said outer tube through the rear end thereof, and provided at its outer end with a finger-piece or thumb-button whereby it may be withdrawn for loading.

5. In a firearm, the combination with the butt-stock and the frame of the arm, of a magazine-tube located within the said butt-stock, and an independently-formed cartridge-feeding chute mounted in the said frame and constituting a continuation of the forward end of the said magazine-tube.

6. In a firearm, the combination with the stock thereof, a magazine-tube located therein and an independent cartridge-feeding chute leading into the frame and constituting a continuation of the said magazine-tube, a frame and a tang carried by the stock, of take-down instrumentalities for securing said frame and tang together whereby the gun may be taken down and reassembled without disturbing the chute in relation to the said tube.

7. In a firearm, the combination with a stock and magazine-tube located therein, an independent cartridge-feeding chute the rear end of which receives the cartridges from the magazine-tube, of a cartridge cut-off mounted in the said chute, and a breech-closure coacting directly with the said cut-off to control the escape of the cartridges from the forward end of the chute.

8. In a firearm, the combination with a butt-stock having a lateral cartridge-feeding opening, of an outer magazine-tube fixed within the butt-stock and having lateral communication with the said opening, an inner magazine-tube entered into the rear end of the said outer magazine-tube through the rear end of the butt-stock, and longitudinally movable to uncover the feeding-opening for the insertion of cartridges into the outer magazine-tube, a tang, a cartridge-feeding chute connected with the tang and forming a continuation of the outer magazine-tube, a cut-off mounted in the said chute, and a breech-closure coacting directly with the cut-off for controlling the escape of cartridges from the forward end of the chute.

9. In a firearm, the combination with the frame, the tang carried by the stock, of take-down instrumentalities connecting the frame and tang, of an independently-formed cartridge-feeding chute connected with the said tang, and receiving cartridges at its rear end, of a cartridge cut-off mounted in the said chute, and a breech-closure coacting directly with the cut-off to control the escape of cartridges from the forward end of the chute.

10. In a firearm, the combination with a stock, a magazine-tube located therein, a cartridge-feeding chute, of a longitudinally-arranged cut-off pivotally connected at its rear end to the said chute and having its forward end formed with a tooth, and a breech-closure coacting directly with the upper edge of the said cut-off for positively forcing the tooth thereof into the cartridge-passage in the chute.

11. In a firearm, the combination with a stock, a magazine-tube located therein, an independent cartridge-feeding chute provided upon its upper face with two parallel flanges, of a cartridge cut-off located between the said flanges, pivoted thereto by a pivot passing through its rear end, and having its forward end provided with a downwardly-extending tooth which passes through an opening formed in the chute between the forward ends of the said flanges, and a breech-closure coacting directly with the said cut-off for positively controlling the escape of the cartridges from the forward end of the chute.

12. In a firearm, the combination with a cartridge-feeding chute, of means for supplying cartridges to the same through the rear end thereof, and a hammer constructed to have the chute pass forward through it.

13. In a firearm, the combination with a cartridge-feeding chute, of a pivotal cartridge cut-off mounted in the said chute, a hammer constructed to have the chute pass forward through it and to swing back and forth over the chute, and a breech-closure coacting with the said cut-off to control the feeding of cartridges from the forward end of the chute, and coacting with the said hammer to cock it.

14. In a firearm, the combination with the breech-block thereof, of a swinging hammer, and an antifriction-roller mounted in the upper rear corner of the block and coacting with the upper wall of the receiver of the gun for reducing the friction of the operation of the block under the upward-swerving thrust imparted to the rear end of the block in cocking the hammer.

15. An automatic firearm having a balanced breech-block provided with a forward extension adapted to extend forward under the barrel of the arm.

16. In an automatic firearm, the combination with a balanced breech-block having a balancing extension projecting forward under the barrel of the arm, and means coacting with the said extension but organized independently thereof for manually opening the block.

17. In an automatic firearm, the combination with a breech-block having a balancing extension projecting forward under the barrel of the arm, and means coacting with the forward end of the said extension but organized independently thereof for manually opening the breech-block.

18. In an automatic firearm, the combination with the receiver thereof, of a breech-block, and means carried by the barrel of the gun and coacting with the said breech-block for manually opening the same but not moving therewith when the breech-block is automatically operated.

19. In an automatic firearm, the combination with a breech-block having a balancing extension projecting forward under the barrel of the arm, of a spring-controlled plunger carried by the barrel of the arm and coacting with the forward end of the said extension for manually opening the breech-block.

20. In an automatic firearm, the combination with the receiver, the barrel and the fore-stock thereof, of a breech-block having a balancing extension projecting forward under the barrel into the fore-stock which is chambered for its reception, and means connected with the receiver of the gun for guiding the said extension.

21. In an automatic firearm, the combination with the receiver, the barrel and the fore-stock thereof, of a breech-block having a balancing extension projecting forward into the fore-stock which is chambered for its reception, a tip located at the forward end of the fore-stock and secured to the barrel of the arm, and means mounted in the said tip for manually opening the breech-block.

22. In an automatic firearm, the combination with the receiver, the barrel and the fore-stock thereof, of a breech-block extending forward into the said fore-stock which is chambered for its reception, a tip located at the forward end of the fore-stock and secured to the barrel, and a plunger mounted in the said tip and coacting with the forward end of the said extension of the breech-block for manually opening the same.

23. In an automatic firearm, the combination with the receiver, the barrel and the fore-stock thereof, of a breech-block extending forward under the barrel into the said fore-stock, a tip located at the forward end of the fore-stock and secured to the barrel, a tubular plunger mounted in the tip and coacting with the extension of the breech-block, and a spring located within the plunger for maintaining the same in its normal or forward position in which it remains unmoved when the breech-block is automatically moved rearward by the firing of the arm.

24. In an automatic firearm, the combination with the barrel thereof, of a breech-block having a balancing extension extending forward along the said barrel, and a guide-rod coacting with the said extension which latter is provided for increasing the weight of the block.

25. In an automatic firearm, the combination with a breech-block having a forwardly-projecting balancing extension extending under the barrel of the gun, of an independently-formed guide-rod fixed to the receiver of the arm and coacting with the said extension for guiding the same, and a spring encircling the guide-rod for returning the block to its normal or closed position.

26. In an automatic firearm, the combination with the receiver and barrel thereof, of a breech-block having a forwardly-projecting balancing extension extending under the said barrel, a guide-rod fixed to the said receiver and passing through the said extension and guiding the movement thereof back and forth.

27. In an automatic firearm, the combination with a breech-block having a forwardly-projecting balancing extension, of a guide-rod coacting with the said extension, and a plunger connected with the barrel of the arm and guided by the forward end of the said guide-rod when the plunger is pushed rearwardly for manually opening the block.

28. In an automatic firearm, the combination with a breech-block provided with a forwardly-projecting balancing extension located below the plane of the block proper and comprising two parallel arms and terminating at their forward ends in a body, of a guide-rod secured at its rear end to the receiver of the firearm, and extending forward between the said parallel arms and through the said body.

29. In an automatic firearm, the combination with the receiver, the barrel and the fore-stock thereof, of a breech-block provided with a balancing extension extending forward under the barrel into the said fore-stock, of a guide-rod coacting with the said extension, a spring coacting with the extension for returning the block to its normal position, a plunger connected with the barrel and coacting with the forward end of the extension for opening the same manually, and a spring for maintaining the plunger in its normal position.

30. In a firearm, an ejector having two differentiated ejecting means located one in front of the other of which the forward is the less aggressive in its action of the two.

31. In a firearm, the combination with the receiver thereof, of a breech-block, an extractor carried thereby, and an ejector provided with a spent-shell-ejecting shoulder and with a loaded-cartridge-ejecting shoulder located behind the same.

32. In a firearm, the combination with a swinging hammer and a trigger therefor, of a longitudinally-movable sear.

33. In a firearm, the combination with the hammer and the trigger thereof, of a longitudinally-movable sear, a hammer-spring, and a sear-spring weaker than the hammer-spring which moves the sear bodily rearward against the tension of the said sear-spring.

34. In a firearm, the combination with the hammer and the trigger thereof, of a sear having an elongated pivot-hole permitting the sear to be longitudinally moved.

35. In a firearm, the combination with the hammer and the trigger thereof, of a pivot-pin on which the trigger swings, and a sear hung on the same pivot-pin and having an elongated pivot-hole to permit it to be longitudinally moved.

36. In a firearm, the combination with the hammer thereof, of a trigger provided with a combined stop and operating lug, and a longitudinally-movable sear coacting at its forward end with the hammer, and formed at its rear end with a combined stop and operating finger coacting with the said lug of the trigger.

37. In an automatic gun, the combination with the breech-block thereof, of a hammer automatically cocked by the opening of the breech-block, a trigger, and a sear moved longitudinally forward when the hammer falls so as to clear itself from the trigger, and moved longitudinally rearward when the hammer is again cocked and the trigger is released.

38. In a firearm, the combination with the hammer thereof, of a trigger, a longitudinally-movable sear, and a sear-spring located within the trigger.

39. In a firearm, the combination with a tang provided at the forward end of its upper prong with an upwardly-extending take-down lug, of a take-down screw mounted therein, and a receiver receiving the said lug and the said screw at its upper rear corner.

40. In a firearm, the combination with a tang provided with an upwardly-extending take-down lug, of a receiver receiving the said lug and provided with an internally-threaded take-down bushing, and a take-down screw mounted in the said lug and entering the said bushing.

41. In a firearm, the combination with a tang provided at the forward end of its upper prong with an upwardly-extending take-down lug having a circular recess formed in its forward face, of a take-down screw mounted in the said lug, a receiver provided at its rear upper corner with a recess receiving the said lug and formed with a transversely-arranged web or bridge, and a take-down bushing mounted in the said web or bridge and receiving the said bushing which projects rearwardly into the said circular recess.

In testimony whereof I have signed this specification in the presence of two subscribing witnesses.

THOMAS C. JOHNSON.

Witnesses:
DANIEL H. VEADER,
A. W. EARLE.